United States Patent
Dunn

(10) Patent No.: US 7,971,893 B1
(45) Date of Patent: Jul. 5, 2011

(54) WHEELCHAIR

(76) Inventor: Bobbie Dunn, Wills Point, TX (US)

( * ) Notice: Subject to any disclaimer, the term of this patent is extended or adjusted under 35 U.S.C. 154(b) by 0 days.

(21) Appl. No.: 12/550,082

(22) Filed: Aug. 28, 2009

Related U.S. Application Data

(60) Provisional application No. 61/096,050, filed on Sep. 11, 2008.

(51) Int. Cl.
*B60K 1/00* (2006.01)
(52) U.S. Cl. ........... 280/304.1; 280/32.7; 280/291; 280/292; 280/304.5; 180/65.1; 180/19.1
(58) Field of Classification Search ........... 180/65.1, 180/907, 19.1, 209; 280/32.7, 304.1, 291, 280/292, 296, 304.5, 87.043, 250.01, 755
See application file for complete search history.

(56) References Cited

U.S. PATENT DOCUMENTS

| | | | | |
|---|---|---|---|---|
| 4,902,029 A * | 2/1990 | Gain et al. | ............ | 280/304.1 |
| 5,904,214 A * | 5/1999 | Lin | ............ | 180/15 |
| 5,944,131 A * | 8/1999 | Schaffner et al. | ............ | 180/65.1 |
| 6,179,076 B1 * | 1/2001 | Fernie et al. | ............ | 180/65.1 |
| 6,186,252 B1 * | 2/2001 | Schaffner et al. | ............ | 180/65.1 |
| 6,220,382 B1 * | 4/2001 | Kramer et al. | ............ | 180/65.51 |
| 6,290,011 B1 * | 9/2001 | Langaker et al. | ............ | 180/65.1 |
| 6,443,252 B1 * | 9/2002 | Andes | ............ | 180/65.1 |
| 6,640,916 B2 * | 11/2003 | Schaffner et al. | ............ | 180/65.1 |
| 7,344,155 B2 * | 3/2008 | Mulhern et al. | ............ | 280/755 |
| 7,735,591 B2 * | 6/2010 | Puskar-Pasewicz et al. | | 180/68.5 |
| 2006/0022445 A1 * | 2/2006 | Mulhern et al. | ............ | 280/755 |
| 2006/0266565 A1 * | 11/2006 | Fontecchio et al. | ............ | 180/6.5 |
| 2007/0074917 A1 * | 4/2007 | Jaenke et al. | ............ | 180/65.1 |
| 2007/0100511 A1 * | 5/2007 | Koerlin | ............ | 701/1 |

* cited by examiner

*Primary Examiner* — J. Allen Shriver, II
*Assistant Examiner* — James Triggs
(74) *Attorney, Agent, or Firm* — Kenneth L Tolar

(57) ABSTRACT

A wheelchair includes a chair member formed of a seat portion with a backrest portion vertically extending therefrom. On each of two opposing sides of the backrest is an armrest that pivots between a horizontal, deployed position when in use, and a stowed, vertical position when a patient is entering or exiting the seat. The chair is mounted on an electronics housing that includes a pair of reversible DC motors and associated gear boxes that rotate a pair of pneumatic tires. A caregiver can stand on a platform behind the chair member when operating the wheelchair. The chair's speed and direction are controlled with either of a pair of control panels. A caregiver's control panel is mounted on a steering bar attached to the rear surface of the backrest while a patient control panel is mounted on one of the armrests.

6 Claims, 1 Drawing Sheet

WHEELCHAIR

CROSS REFERENCE TO RELATED APPLICATIONS

This application is entitled to the benefit of provisional application No. 61/096,050 filed on Sep. 11, 2008, the specification of which is incorporated herein by reference.

BACKGROUND OF THE INVENTION

The present invention relates to a motorized wheelchair that can be operated by either a caregiver or a patient.

DESCRIPTION OF THE PRIOR ART

Numerous motorized wheelchairs exist in the prior art. However, most include fixed seats that hinder the patient when entering or exiting the chair. Furthermore, conventional motorized wheelchairs can only be operated by the patient, which can be impossible for those with extreme disabilities. Accordingly, there is currently a need for an improved, motorized wheelchair that is more versatile and functional than conventional wheelchairs. The present invention addresses this need by providing a wheelchair designed for easy entry and exit, and which can be operated by either a caregiver or the occupant.

SUMMARY OF THE INVENTION

The present invention relates to a wheelchair comprising a chair member formed of a seat portion with a backrest portion vertically extending therefrom. On each of two opposing sides of the backrest is an armrest that pivots between a horizontal, deployed position when in use, and a stowed, vertical position when a patient is entering or exiting the seat. The chair is mounted on an electronics housing that includes a pair of reversible DC motors and associated gear boxes that independently rotate a pair of pneumatic tires. A caregiver stands on a pivotal platform behind the chair member when operating the wheelchair. The chair's speed and direction are controlled with either of a pair of control panels. A caregiver's control panel is mounted on a steering bar attached to the rear surface of the backrest while a patient control panel is mounted on one of the armrests.

It is therefore an object of the present invention to provide a wheelchair that overcomes the disadvantages of conventional motorized wheelchairs.

It is another object of the present invention to provide a motorized wheelchair that can be operated by either a caregiver or a patient.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
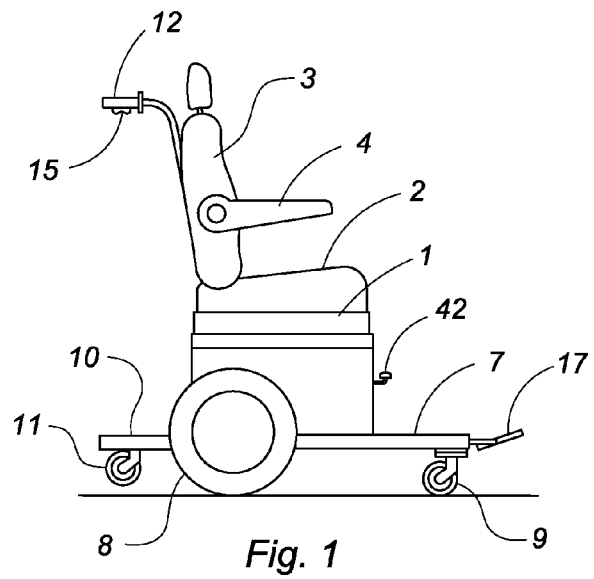
FIG. 1 is a side view of the wheelchair according to the present invention.
Figure 2:
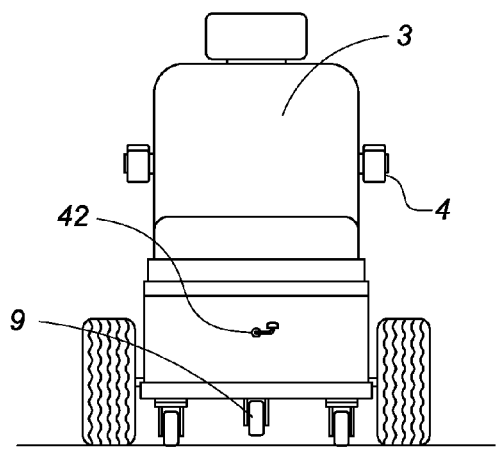
FIG. 2 is a rear view of the wheelchair.
Figure 3:
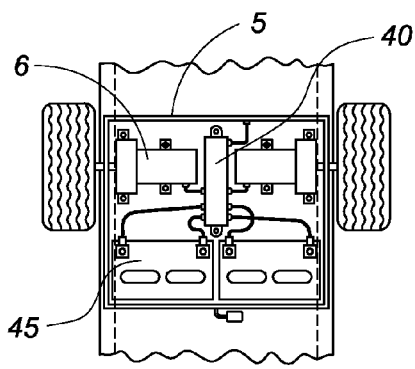
FIG. 3 is a top, cutaway view of the electronics housing.
Figure 4:
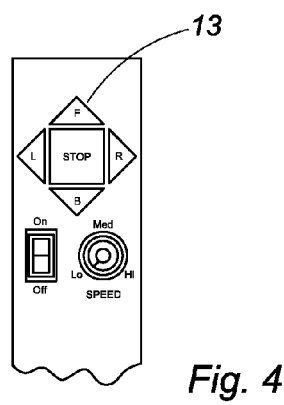
FIG. 4 depicts the patient control panel.
Figure 5:
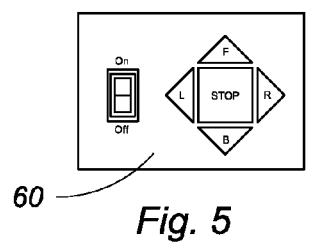
FIG. 5 depicts the caregiver controls.

The present invention relates to a wheelchair comprising a chair member 1 formed of a seat portion 2 with a backrest portion 3 vertically extending therefrom. On each of two opposing sides of the backrest is an armrest 4 that pivots between a horizontal, deployed position when in use, and a stowed, vertical position when a patient is entering or exiting the seat. The chair is mounted on an electronics housing 5 that includes a pair of reversible DC (battery 45) motors 6 and associated gear boxes. Beneath the housing 5 is a base pan 7 having a front edge, a rear edge and two opposing side edges; each motor drives a designated pneumatic tire 8 positioned adjacent each of the two side edges of the base pan, near the rear edge thereof. Because each tire is independently rotatable, an operator can steer the wheelchair or spin it in a circle if desired. A plurality of casters 9 are secured to the front edge of the pan for additional support and stability.

Hingedly attached to the rear edge of the base pan is a caregiver platform 10 on which a caregiver stands when operating the wheelchair. The platform may be pivoted upwardly and magnetically secured to the electronics housing if the caregiver prefers to walk behind the wheelchair instead of riding on the platform. The platform is mounted on two or more casters 11 that are normally suspended immediately above an underlying surface; the casters prevent the chair from toppling when someone stands on the platform.

The chair's speed and direction are controlled with either of a pair of control devices that communicate with a controller 40. A caregiver's control handle 12 with associated controls 60 is mounted on the rear surface of the backrest while a patient control panel 13 is mounted on one of the armrests. If the caregiver's control handle is activated, the patient control panel is automatically deactivated. The caregiver's handle includes a button 15 that is spring-biased to an "off" position so that the wheelchair slowly stops when the button is released. Optionally, the control panel and speed control/steering handle can be replaced with a joystick. Exemplary control switches and functions for each control panel are summarized below:

| Switch | Operation |
| --- | --- |
| On/off | Powers the system allowing the controller to accept inputs from the controls. |
| F = forward | Causes both wheels to turn at the same rate and direction so that the chair is propelled forward. |
| B = Back | Causes both wheels to turn at the same rate and direction so that the chair is propelled backward. The speed is controlled to less than 2 mph in reverse. |
| L = left | Rotates the left wheel counterclockwise and the right wheel clockwise to turn the chair left |
| R = right | Rotates the left wheel clockwise and the right wheel counterclockwise to turn the chair right. |
| Speed control | Causes the motors to operate at increasing speeds until the maximum speed of 4.5 mph is achieved. The speed control is spring-loaded so that it returns to the zero speed setting when released. |
| Stop | Disconnects the drive power to motors and inputs a small current into the stators of the motors, providing hard braking for the chair. These small holding currents lock the chair in place with the gearing from the transfer cases. |

| Switch | Operation |
| --- | --- |
| Brake | A manual brake is located on the front of the drive box assembly and can be depressed to manually apply the parking brake 42, which is an internal disc brake on each motor shaft. |

Preferably, the chair member is rotatable ninety degrees in either direction to assist a patient with entering or exiting the wheelchair. The chair member is secured in a forward, operating position with a locking pin. Preferably, removable footrests 17 are secured to the front edge of the base pan for enhanced comfort.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A wheelchair comprising:
  a wheel assembly formed of a pair of independently-operable motorized tires;
  a base pan supported by said wheel assembly, said base pan having a front edge and a rear edge;
  a chair member mounted on said base pan, said chair member formed of a seat portion with a backrest portion vertically extending therefrom, said backrest having two opposing sides and a rear surface;
  an electronics housing beneath said chair, said housing having a pair of motors received therein, each of said motors discretely operating one of said tires;
  a pivotal armrest on each of said opposing sides, said armrests pivotal between a horizontal, deployed position when in use, and a stowed, vertical position to allow a patient to enter and exit said seat portion;
  a caregiver platform hingedly attached to the rear edge of the base pan on which a caregiver stands when operating the wheelchair;
  a handlebar mounted on the rear surface of said backrest, said handlebar having direction switches and a speed control switch thereon that independently rotate each of said tires at a desired speed to allow a caregiver to steer said wheelchair and to propel said wheelchair at a desired speed, wherein said speed control switch is spring-biased in a disabled position wherein the motorized tires are disabled so that the wheelchair slowly stops when the speed control switch is released.

2. The wheelchair according to claim 1 wherein said platform is magnetically securable to said electronics housing in a vertical position to allow a caregiver to walk behind the chair member in lieu of riding on said platform.

3. The wheelchair according to claim 2 further comprising a plurality of casters secured to the front edge of the pan for additional support and stability.

4. The wheelchair according to claim 3 wherein said platform is mounted on a pair of casters that are suspended immediately above an underlying surface to prevent the chair member from toppling when someone stands on the platform.

5. The wheelchair according to claim 4 wherein said chair member is rotatable in either of two directions to facilitate entering and exiting said wheelchair.

6. The wheelchair according to claim 5 further comprising a second control means positioned on one of said armrests for alternatively allowing a patient seated within said chair member to operate said wheel assembly.

* * * * *